(12) United States Patent
Laferty

(10) Patent No.: US 10,330,253 B1
(45) Date of Patent: Jun. 25, 2019

(54) LIGHTING SYSTEM SUPPORT

(71) Applicant: Andrew Laferty, Mt. Pleasant, MI (US)

(72) Inventor: Andrew Laferty, Mt. Pleasant, MI (US)

(*) Notice: Subject to any disclaimer, the term of this patent is extended or adjusted under 35 U.S.C. 154(b) by 0 days.

(21) Appl. No.: 15/928,588

(22) Filed: Mar. 22, 2018

(51) Int. Cl.
*F21S 4/10* (2016.01)
*F16M 13/02* (2006.01)
*F21V 17/12* (2006.01)
*F21W 121/00* (2006.01)

(52) U.S. Cl.
CPC ............ *F16M 13/02* (2013.01); *F21S 4/10* (2016.01); *F21V 17/12* (2013.01); *F21W 2121/00* (2013.01)

(58) Field of Classification Search
CPC ............ F16M 13/02; F21S 4/10; F21V 17/12; F21W 2121/00
See application file for complete search history.

(56) References Cited

U.S. PATENT DOCUMENTS

| 5,021,935 | A | * | 6/1991 | Gary | F21V 1/00 362/237 |
|---|---|---|---|---|---|
| 5,281,158 | A | * | 1/1994 | Lin | F21S 4/10 200/51.1 |
| 5,361,192 | A | * | 11/1994 | Lai | A47G 33/0836 362/123 |
| 5,931,568 | A | * | 8/1999 | Chuang | F21V 3/00 362/122 |
| 5,934,785 | A | * | 8/1999 | Chen | A47G 33/08 362/124 |
| 2003/0043579 | A1 | * | 3/2003 | Rong | F21V 3/02 362/237 |
| 2005/0185400 | A1 | * | 8/2005 | Hsu | A47G 33/0836 362/238 |
| 2013/0033869 | A1 | * | 2/2013 | Millington | F21S 8/061 362/249.16 |

FOREIGN PATENT DOCUMENTS

CN 205678444 U * 11/2016

* cited by examiner

*Primary Examiner* — Mary Ellen Bowman

(57) ABSTRACT

A support for a lighted decoration, the lighted decoration containing such supports, and a combination of a support including at least one light, is disclosed.

7 Claims, 5 Drawing Sheets

LIGHTING SYSTEM SUPPORT

BACKGROUND OF THE INVENTION

The applicant is unaware of any prior art in the field of this invention.

THE INVENTION

The present invention is a support for lighted decorations. The support comprises a first hub. The first hub is sufficient in size to hold a miniature liquor bottle by the liquor bottle top end. The first hub has a lower edge. The inside of the lower edge is beveled. The first hub has a first centered opening through it.

The second hub is integrally surmounted and centered on a top surface of the first hub. The second hub has a centered opening through it to allow the insertion of a decorative light fixture. The second hub has an upper surface and the upper surface is concave.

Another embodiment of the instant invention is a combination of a support and a decorative light fixture mounted in the centered opening of the second hub.

An additional embodiment is a support for lighted decorations in combination where there are multiple decorative light fixtures and multiple supports in an electrifiable string.

The present invention is a support for lighted decorations in combination where, in addition, there is a miniature liquor bottle mounted in the first hub.

The present invention is a support for lighted decorations in combination where there are multiple miniature liquor bottles mounted in each of first hubs of each of the supports.

DETAILED DESCRIPTION OF THE DRAWINGS

Figure 1:
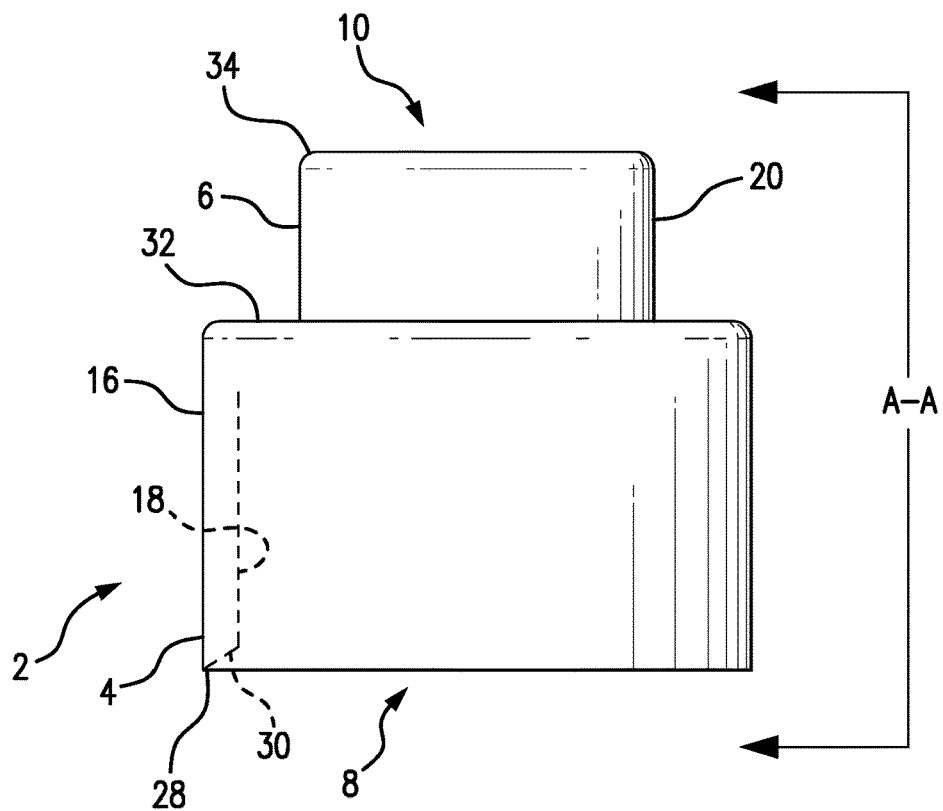
FIG. 1 is a full side view of the support.

FIG. 1 shows the support 2 for the lighted decoration from the side. The support 2 comprises a first hub 4. The first hub 4 is sufficient in size to hold a miniature liquor bottle 24 (shown in FIG. 8) by the top 24 of the liquor bottle at top end 26 (shown in FIG. 8). The first hub 4 has a lower edge 28. The first hub 4 has an outside surface 16. The inside surface 18 of the lower edge 28 is beveled 30. The first hub 4 has a first centered opening 8 through it.

The support 2 has a second hub 6. The second hub 6 is integrally surmounted and centered on a top surface 32 of the first hub 4. The second hub 6 has an outside surface 20. The second hub 6 has a centered opening 10 through it to allow the insertion of a decorative light fixture 14 (shown in FIG. 4). The second hub 6 has an upper surface 34 and the upper surface 34 is concave. (shown in FIG. 9).

Figure 9:
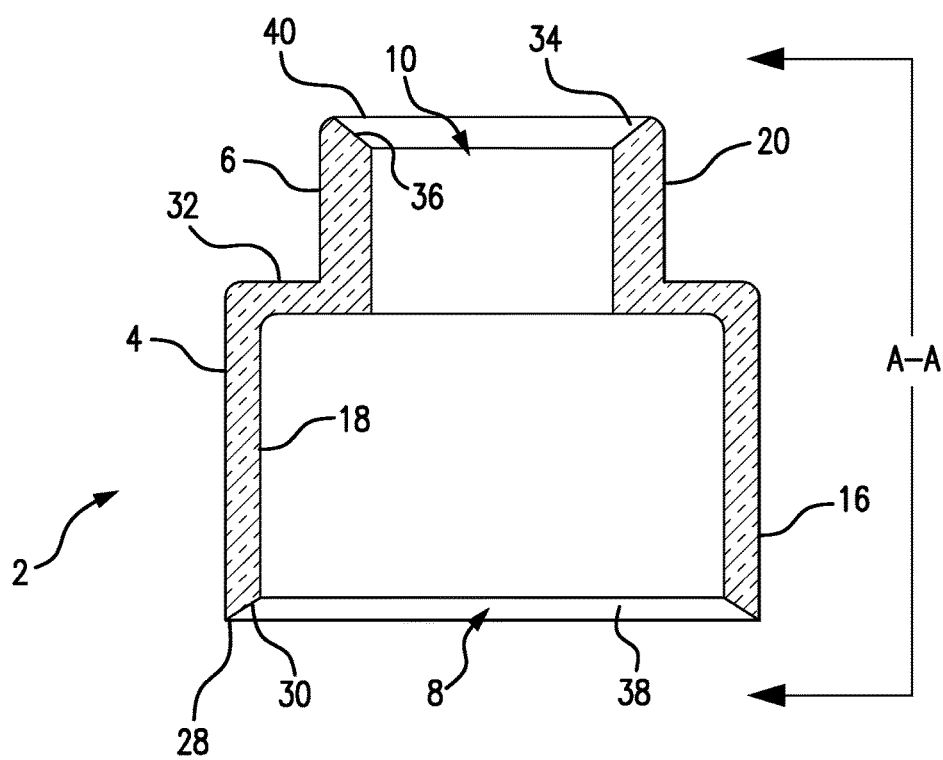
FIG. 9 is a sectional view of line A-A of FIG. 1.

There is a cross sectional Figure, FIG. 9, with line A-A from FIG. 1. The line A-A bisects the support exposing the interior of the support 2.

Figure 2:
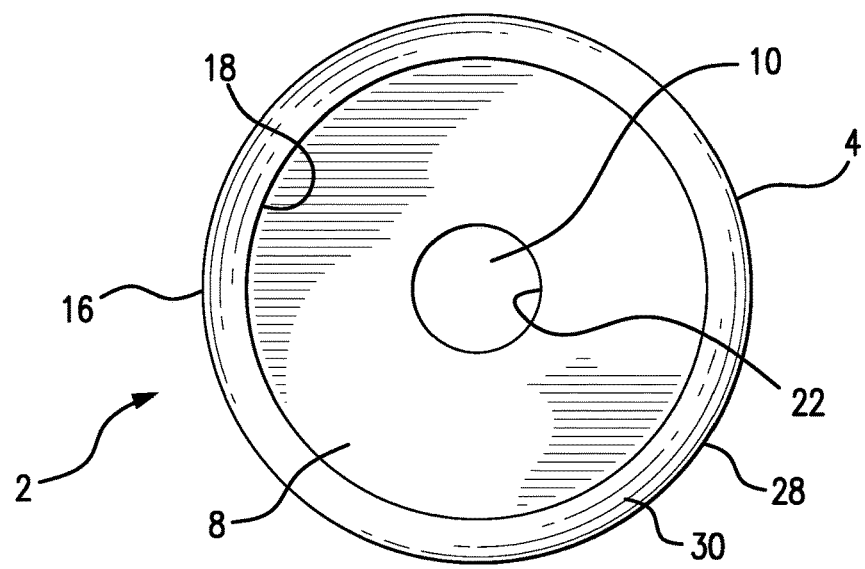
FIG. 2 is a full bottom view of the support.

FIG. 2 shows the support 2 from the bottom end 38. This Figure shows the inside of the support 2. The outside surface 16 of the first hub 4 is clear. The opening therethrough 8 allows one to see the opening therethrough 10 of the second hub 6. Also shown is the inside surface 16 of the first hub 4. Also shown is the inside surface 22 of the second hub 6. The lower edge 28 of the first hub 4 shows the beveled edge 30.

Figure 3:
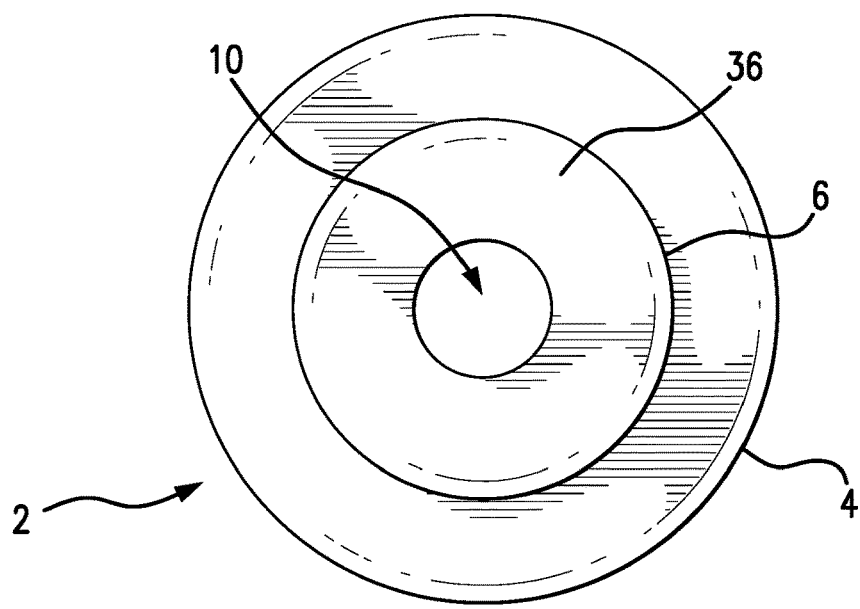
FIG. 3 is a full top view of the support.

FIG. 3 shows the support 2 from the top end 40. Shown here are the first hub 4 and the second hub 6. Also shown are the concave surface 36 and the opening 10 through the second hub 6.

Figure 4:
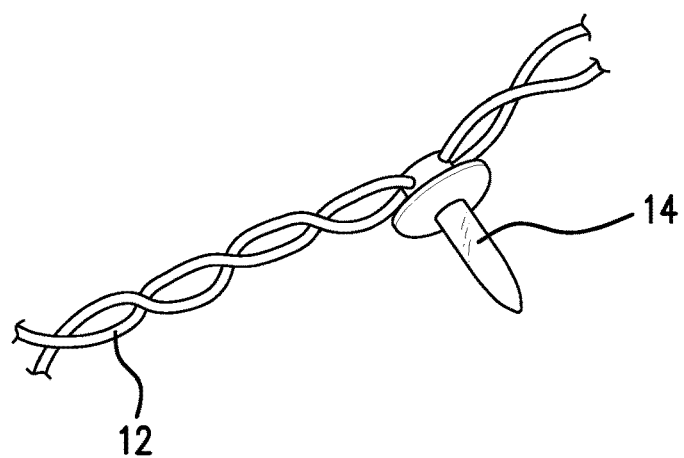
FIG. 4 a view of the light and associated wiring.

FIG. 4 shows a light 14 and associated wiring 12. The lighting 14 and wiring 12 is produced in a plurality of lights 14. The plurality of lights 14 produce strings of lights 14 for hanging to produce decorative lights 14 for holidays and celebrations, and the like.

Figure 5:
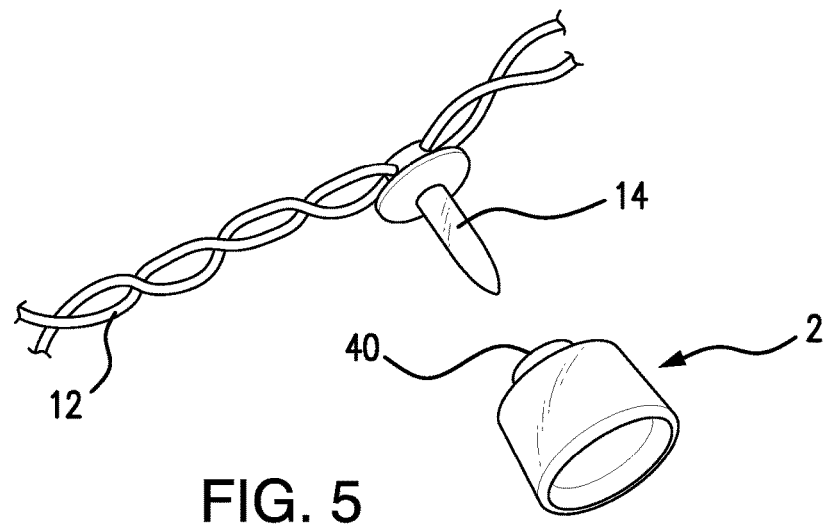
FIG. 5 is a view of the light and associated wiring near the support.

FIG. 5 shows the light 14 and associated wiring 12 near the support 2. The light 14 is inserted into the top end 40 of the support 2.

Figure 6:
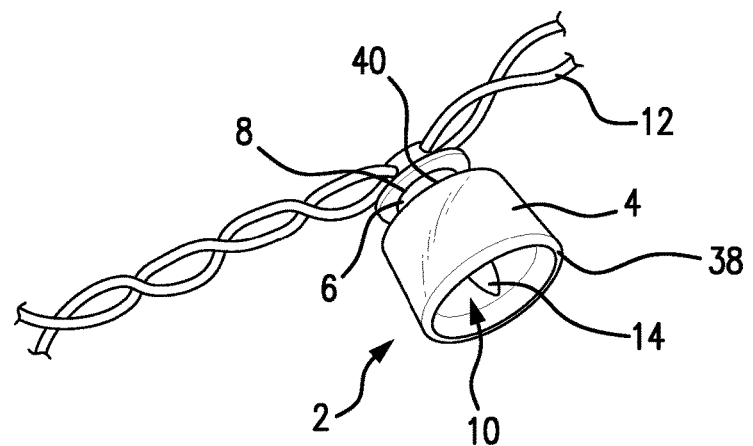
FIG. 6 is a view of the light and the associated wiring inserted in the support.

FIG. 6 shows the light 14 and the associated wiring 12 inserted into the support 2. The light 14 inserts through the opening 10 through the top end 40 of the second hub 6. It has been discovered that the concaved portion 36 of the second hub 6 allows for insertion and retention of the light 14 within the second hub 6. The light 14 extends through the opening 8 of the first hub 4 and the bottom end 38.

Figure 7:
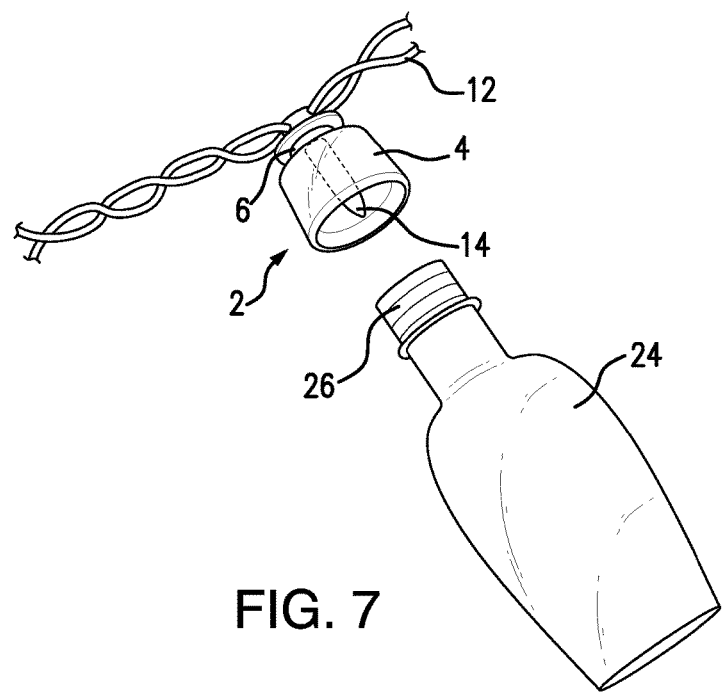
FIG. 7 is a view showing the light and the associated wiring inserted in the support near a bottle.

FIG. 7 shows the light 14 and the associated wiring 12 inserting into the support 2 near a bottle 24. The bottle 24 has the light 14 inserted through the top end 40 of the second hub 6. The top end 26 of the bottle 24 fits firmly within the inside surface 16 of the first hub 4. It has been discovered that the beveled portion 30 of lower edge 28 of the first hub 4 allows for insertion and retention of the bottle 24 into the first hub 4.

Figure 8:
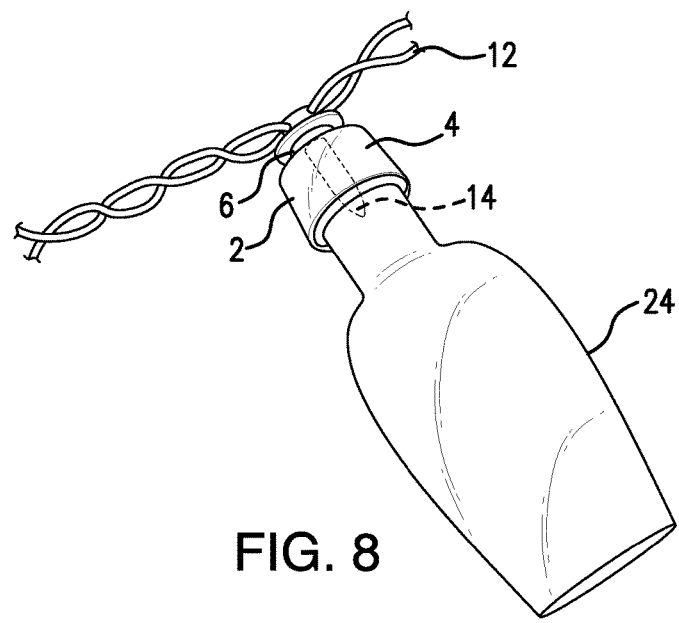
FIG. 8 is a full view of the light and associated wiring inserted in the support with the bottle inserted into the support.

FIG. 8 shows the light 14 and associated wiring 12 inserted to the support 2 attaching it to the bottle 24. The insertion of the light 14 into the bottle 24 produces the decorative lighting providing the utility of the present invention. Again, it has been discovered that the concave portion 36 of the second hub 6 allows for insertion and retention of the light 14 within the second hub 6. It has also been discovered that the beveled portion 30 of the first hub 4 allows for the insertion and retention of the bottle 24 within the first hub 4. The insertion of the light 14 into the support 2 and then the insertion of the bottle 24 into the support 2 creates the decorative light of the present invention.

FIG. 9 is a sectional view of line A-A of FIG. 1. The sectional view shows the support 2 with the first hub 4 and the second hub 6. Also shown is the opening 8 through the first hub 4. The opening 10 through the second hub 6 is also clear. The first hub 4 has an outside surface 16 and an inside surface 18. The first hub 4 also has a lower edge 28 and this lower edge 28 is beveled 30. The first hub 4 also has a top surface 32.

The second hub 6 also has an outside surface 20 and an inside surface 22. The hub 6 has an upper surface 34. This upper surface 34 is concave 36. The support 2 has a top end 40 and a bottom end 38. Miniature liquor bottles are those of about 2 ounces similar to those served on airline flights.

Typically, the support of this invention is essentially about 2 centimeters in outside diameter at the bottom, about 9/10 of a outside centimeter at the top, with the top opening being about centimeter in diameter and the opening on the bottom being about 1 8/10 of a centimeter in diameter. The overall length is about 2 centimeters.

The supports of this invention can be manufactured from soft rubber or soft plastic that will enable one to insert the lights and the bottle tops.

What is claimed is:

1. A support for lighted decorations, said support comprising:
   a. a first hub, said first hub sufficient in size to hold a miniature liquor bottle by said liquor bottle top end, said first hub having a lower edge, the inside of said lower edge being beveled, said first hub having a first centered opening therethrough;
   b. a second hub, integrally surmounted and centered on a top surface of said first hub, said second hub having a centered opening therethrough to allow the insertion of a decorative light fixture, said second hub having an upper surface and said upper surface being concave.

2. The support as claimed in claim 1 wherein said support is manufactured from plastic.

3. The support as claimed in claim 1 wherein said support is manufactured from rubber.

4. In combination, a support as claimed in claim 1 and a decorative light fixture mounted in said centered opening of said second hub.

5. The combination as claimed in claim 4 wherein there are multiple decorative light fixtures and multiple supports in an electrifiable wire string.

6. The combination as claimed in claim 4 wherein, in addition, there is a miniature liquor bottle mounted in said first hub.

7. The combination as claimed in claim 5 wherein there are multiple miniature liquor bottles mounted in each of first hubs of each of the supports.

* * * * *